United States Patent
Kim et al.

(10) Patent No.: US 12,397,686 B2
(45) Date of Patent: Aug. 26, 2025

(54) FULL-FLAT REAR SEAT

(71) Applicants: Hyundai Motor Company, Seoul (KR); Kia Corporation, Seoul (KR)

(72) Inventors: Young Dong Kim, Seongnam-Si (KR); Jae Eun Chang, Gwangmyeong-Si (KR); Qi Jiang Li, Yantai (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 372 days.

(21) Appl. No.: 18/101,981

(22) Filed: Jan. 26, 2023

(65) Prior Publication Data
US 2024/0174137 A1    May 30, 2024

(30) Foreign Application Priority Data
Nov. 29, 2022    (CN) .......................... 202211512027.X

(51) Int. Cl.
*B60N 2/20* (2006.01)
*B60N 2/80* (2018.01)

(52) U.S. Cl.
CPC ............... *B60N 2/206* (2013.01); *B60N 2/80* (2018.02); *B60N 2002/899* (2018.02)

(58) Field of Classification Search
None
See application file for complete search history.

(56) References Cited

U.S. PATENT DOCUMENTS

| | | | | |
|---|---|---|---|---|
| 2,357,729 | A * | 9/1944 | De Fries | B60N 2/34 5/118 |
| 3,011,822 | A * | 12/1961 | May | B60N 2/3031 296/66 |
| 3,097,881 | A * | 7/1963 | Aguilar | B60N 2/3013 296/69 |
| 4,443,034 | A * | 4/1984 | Beggs | B60N 2/3011 296/37.16 |
| 5,322,335 | A * | 6/1994 | Niemi | B60R 13/01 296/97.23 |
| 9,545,886 | B2 * | 1/2017 | Ha | B60R 13/011 |
| 10,406,959 | B2 * | 9/2019 | Vo | B60N 2/206 |

FOREIGN PATENT DOCUMENTS

| | | | |
|---|---|---|---|
| JP | 2007-302144 A | | 11/2007 |
| JP | 2017-19343 | * | 1/2017 |
| KR | 0138828 | * | 6/1998 |
| KR | 10-0512877 B1 | | 8/2005 |
| KR | 10-0591531 B1 | | 6/2006 |

\* cited by examiner

*Primary Examiner* — Joseph D. Pape
(74) *Attorney, Agent, or Firm* — Morgan, Lewis & Bockius LLP

(57) ABSTRACT

A full-flat rear seat is a collapsible full-flat rear seat including a seatback board mounted on a rear surface of a backrest of the rear seat of a vehicle and providing a flat support surface together with a luggage board of the vehicle in being selectively unfolded, when the rear seat rotates, and the seatback board includes: a center seatback board mounted on a rear surface of the rear seat of the vehicle; an upper seatback board provided at an upper side of the center seatback board and configured to move relative to the center seatback board; and a lower seatback board provided at a lower side of the center seatback board and hinged thereto and configured to hingedly rotate toward one surface of the center seatback board.

13 Claims, 15 Drawing Sheets

FULL-FLAT REAR SEAT

CROSS-REFERENCE TO RELATED APPLICATION

The present application claims priority to and the benefit of Chinese Patent Application No. 202211512027.X filed in the Chinese National Intellectual Property Administration on Nov. 29, 2022, the entire contents of which are incorporated herein by reference.

BACKGROUND OF THE PRESENT DISCLOSURE

Field of the Present Disclosure

The present disclosure relates to a full-flat rear seat, and more particularly, to a full-flat rear seat including a seatback board mounted on a rear seat of a vehicle, the full-flat rear seat being configured to provide a full-flat support surface together with a luggage board.

Description of Related Art

In general, a sports utility vehicle (SUV, MPV) has a luggage loading space disposed rearward of a rear seat and configured to accommodate various types of luggage. To use a maximally large luggage loading space, it is possible to expand the luggage loading space by fully folding forward a backrest of a rear seat.

Furthermore, the luggage loading space may be used as a bedroom or resting space in which an occupant may lie. The space typically has a length of about 1.5 meters (m) and is a space which is too narrow to allow the occupant to lie.

Therefore, a solution for using the folded backrest of the rear seat as an extension space of the luggage loading space has been studied. However, in the case in which the loading space is expanded by folding the backrest forward, there is a problem in that a bottom surface of the expanded loading space is not uniform. Furthermore, because the backrest of the rear seat has a length of about 0.67 meters, the space cannot be sufficiently expanded because a pillow space or the like is required even though the loading space is expanded.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a full-flat rear seat configured for defining a flat support surface by being unfolded, as necessary, on a rear surface of a backrest of the rear seat of a vehicle when a loading space is expanded by folding forward the rear seat of the vehicle.

Various aspects of the present disclosure are directed to providing a full-flat rear seat, which is a collapsible full-flat rear seat including a seatback board mounted on a rear surface of a backrest of the rear seat of a vehicle and providing a flat support surface together with a luggage board of the vehicle in being selectively unfolded, when the rear seat rotates, in which the seatback board includes: a center seatback board mounted on a rear surface of the rear seat of the vehicle; an upper seatback board provided at an upper side of the center seatback board and configured to move relative to the center seatback board; and a lower seatback board provided at a lower side of the center seatback board and hinged thereto and configured to hingedly rotate toward one surface of the center seatback board.

The upper seatback board may be provided to hingedly rotate toward the one surface of the center seatback board.

The upper seatback board and the lower seatback board may be fixed to each other by a locking device in a state in which the upper seatback board hingedly rotates and comes into contact with the center seatback board.

The locking device may be provided in the form of a bar coupled to a protrusion protruding from the other surface of the lower seatback board and configured to be rotatable about the protrusion, and the locking device may rotate in a groove formed over the other surface of the lower seatback board and the other surface of the upper seatback board.

A mat may be attached and provided onto one surface of the seatback board and cover the seatback board.

A headrest configured to support a passenger's head may be inserted and provided into an upper end portion of the rear seat, and the headrest may be inserted into the upper end portion of the rear seat in different forward and rearward directions as the rear seat rotates.

The headrest may include: a pad configured to support the passenger's head; and a stay including a first end portion inserted into the pad and a second end portion protruding to the outside and inserted and fixed into the upper end portion of the rear seat.

A seatback insertion groove may be formed in the pad so that an upper side of the upper seatback board is insertable into the seatback insertion groove when the seatback board is unfolded as the rear seat rotates.

The lower seatback board may connect to the luggage board to define a flat surface in a state in which the seatback board is unfolded.

The upper seatback board may be provided at the upper side of the center seatback board and configured to slide relative to the center seatback board.

A headrest configured to support a passenger's head may be inserted and provided into an upper end portion of the rear seat, and the headrest may be bent at the upper end portion of the rear seat while defining an angle.

According to the exemplary embodiment of the present disclosure, the seatback board may be provided and attached to the rear surface of the backrest of the rear seat of the vehicle, and the rear seat may be folded forward thereof. Therefore, it is possible to improve integrity of the seatback board and the rear seat in a non-used condition and expand the rear loading space.

Furthermore, the seatback board is divided into three pieces, and the lower seatback board is unfolded between the rear seat and the luggage board so that the gap between the rear seat and the luggage board may be filled, and the expanded loading space may be entirely flat.

Furthermore, because the headrest may be detachably attached to the upper end portion of the rear seat in the different forward and rearward directions, the headrest may be used as a pillow, and the luggage loading space may be further expanded to that extent.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
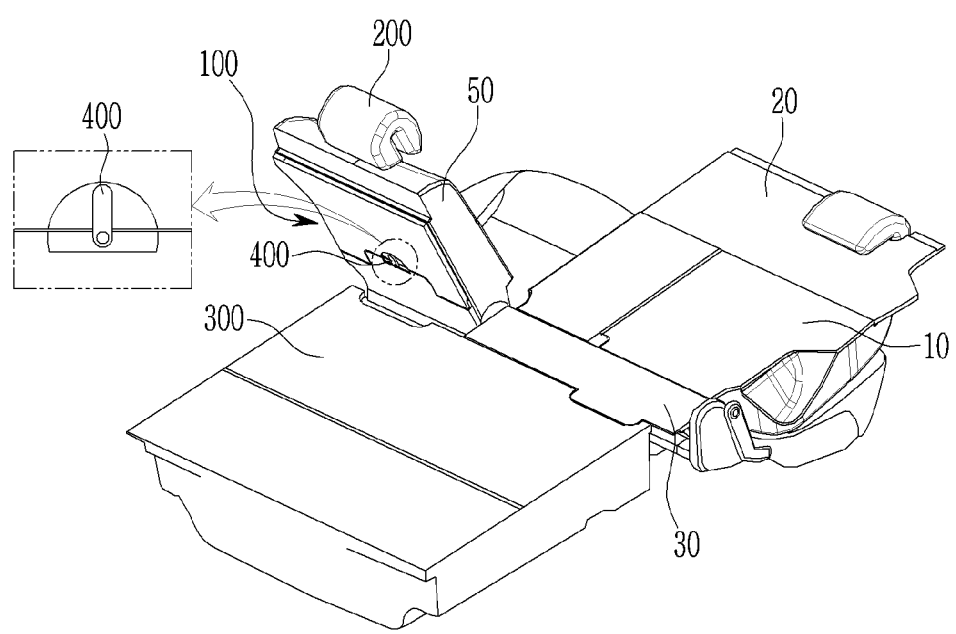
FIG. 1 is a view exemplarily illustrating a folded state and a non-folded state of a full-flat rear seat according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those with ordinary skill in the art to which an exemplary embodiment of the present disclosure pertains may easily carry out the embodiments. The present disclosure may be implemented in various different ways and is not limited to the exemplary embodiments described herein.

Furthermore, the constituent elements including a same configurations in several embodiments will be assigned with a same reference numerals and described only in the representative embodiment, and only the constituent elements, which are different from the constituent elements according to the representative embodiment, will be described in other exemplary embodiments of the present disclosure.

It is noted that the drawings are schematic and are not illustrated based on actual scales. Relative dimensions and proportions of parts illustrated in the drawings are exaggerated or reduced in size for clarity and convenience in the drawings, and any dimension is just illustrative but not restrictive. The same reference numerals designate the same structures, elements or components illustrated in two or more drawings in order to exhibit similar characteristics. When one component is described as being positioned "above" or "on" another component, one component can be positioned "directly on" another component, and one component can also be positioned on another component with other components interposed therebetween.

The exemplary embodiment of the present disclosure specifically illustrates an example of the present disclosure. As a result, various modifications of the drawings are expected. Therefore, the embodiments are not limited to specific forms in regions illustrated in the drawings, and for example, include modifications of forms by the manufacture thereof.

Hereinafter, a full-flat rear seat for a vehicle according to various exemplary embodiments of the present disclosure will be described with reference to FIG. 1, FIG. 2, and FIG. 3.

Figure 2:
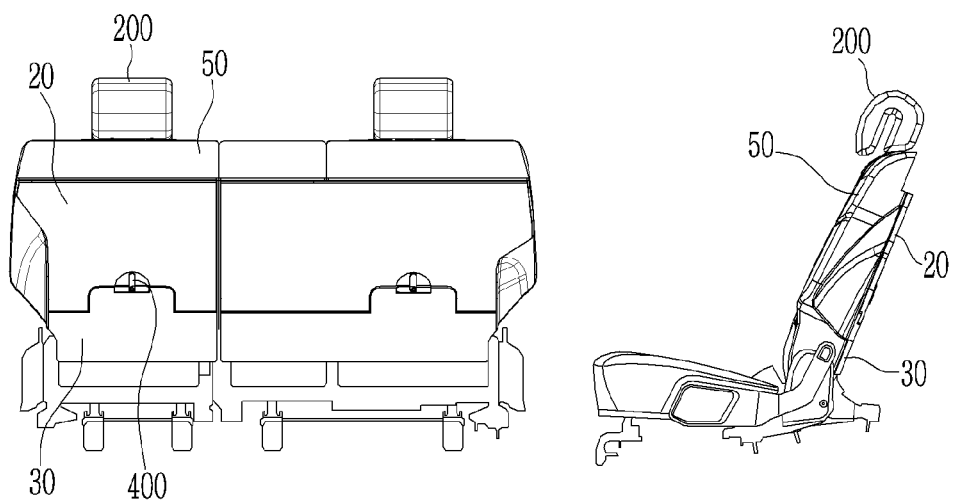
FIG. 2 is a view exemplarily illustrating the non-folded state of the full-flat rear seat according to the exemplary embodiment of the present disclosure when viewed from the rear and lateral sides.
Figure 3:
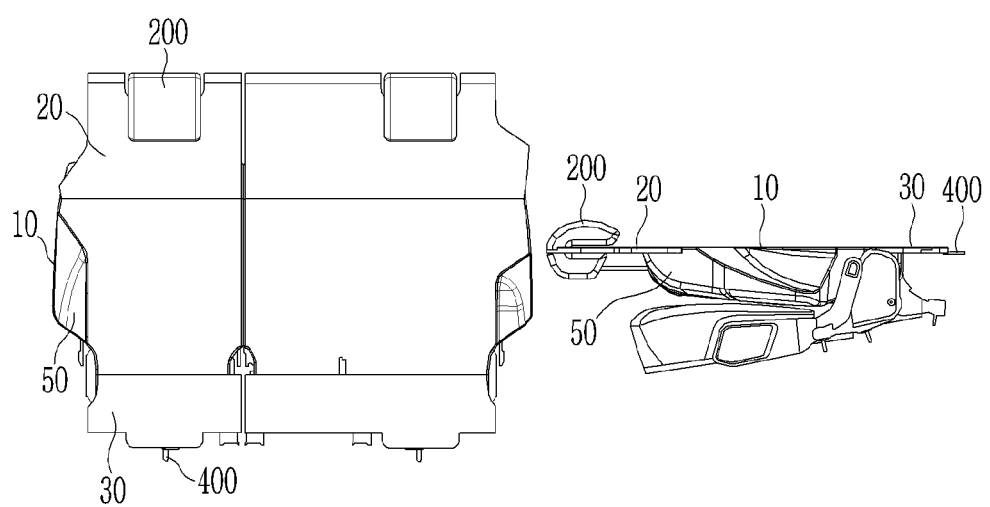
FIG. 3 is a view exemplarily illustrating the folded state of the full-flat rear seat according to the exemplary embodiment of the present disclosure when viewed from the rear and lateral sides.

FIG. 1 is a view exemplarily illustrating a folded state and a non-folded state of a full-flat rear seat according to various exemplary embodiments of the present disclosure, FIG. 2 is a view exemplarily illustrating the non-folded state of the full-flat rear seat according to the exemplary embodiment of the present disclosure when viewed from the rear and lateral sides, and FIG. 3 is a view exemplarily illustrating the folded state of the full-flat rear seat according to the exemplary embodiment of the present disclosure when viewed from the rear and lateral sides.

Referring to FIG. 1, FIG. 2, and FIG. 3, the full-flat rear seat according to the exemplary embodiment of the present disclosure is a collapsible full-flat rear seat including a seatback board 100 mounted on a rear surface of a backrest of a rear seat 50 of a vehicle and configured to provide a flat support surface together with a luggage board 300 of the vehicle by being unfolded, as necessary, when the rear seat 50 rotates.

When the backrest of the rear seat 50 is fully folded forward, a luggage loading space disposed rearward of the rear seat 50 may be expanded. The luggage loading space may be used as a bedroom or resting space in which an occupant may lie, as necessary.

The seatback board 100 may be mounted on the rear surface of the backrest of the rear seat 50. The seatback board 100 includes a center seatback board 10, an upper seatback board 20, and a lower seatback board 30.

The seatback board 100 may have a horizontal length approximately equal to a horizontal length of the rear seat 50 so that the horizontal length of the seatback board 100 does not exceed the horizontal length of the rear seat 50. The center seatback board 10 may be mounted on and fixed to the rear surface of the rear seat 50 of the vehicle.

The upper seatback board 20 may be provided at an upper side of the center seatback board 10 and move relative to the center seatback board 10. The upper seatback board 20 may be provided to hingedly rotate toward the one surface of the center seatback board 10. When the rear seat 50 is folded forward, the upper seatback board 20 may hingedly rotate toward a front side of the vehicle so that the upper seatback board 20 is placed on approximately the same plane as the center seatback board 10.

The lower seatback board 30 may be provided at a lower side of the center seatback board 10 to hingedly rotate toward one surface of the center seatback board 10. When the rear seat 50 is folded forward, the lower seatback board 30 may hingedly rotate toward a rear side of the vehicle so that the lower seatback board 30 is placed on approximately the same plane as the center seatback board 10. In the instant case, the lower seatback board 30 may fill a gap between the rear seat 50 and the luggage board 300.

Because the center seatback board 10, the upper seatback board 20, and the lower seatback board 30 are unfolded to be placed on approximately the same plane, the expanded loading space may be entirely flat.

Meanwhile, when the rear seat 50 is not tilted forward, the center seatback board 10, the upper seatback board 20, and the lower seatback board 30 are folded with respect to one another so that one surface of the upper seatback board 20 and one surface of the lower seatback board 30 are in contact with one surface of the center seatback board 10. In the instant case, the upper seatback board 20 and the lower seatback board 30 may be fixed to each other by a locking device 400.

Figure 4:
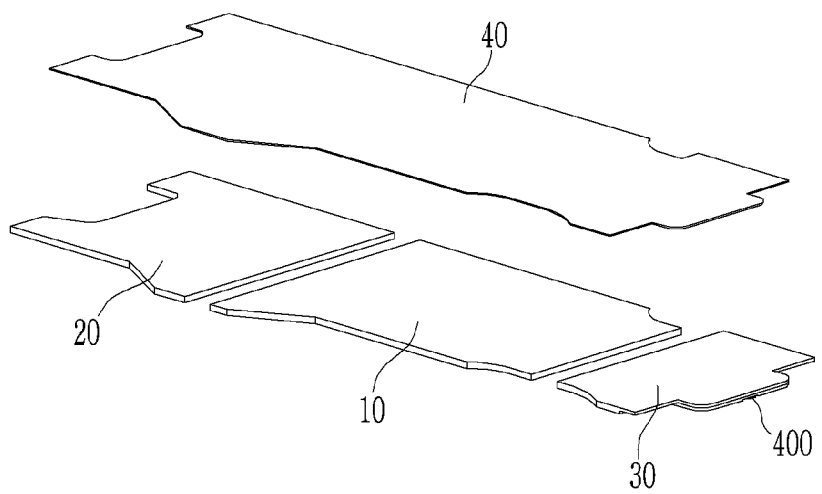
FIG. 4 is an exploded perspective view exemplarily illustrating a seatback board and a mat of the full-flat rear seat according to the exemplary embodiment of the present disclosure.
Figure 5:
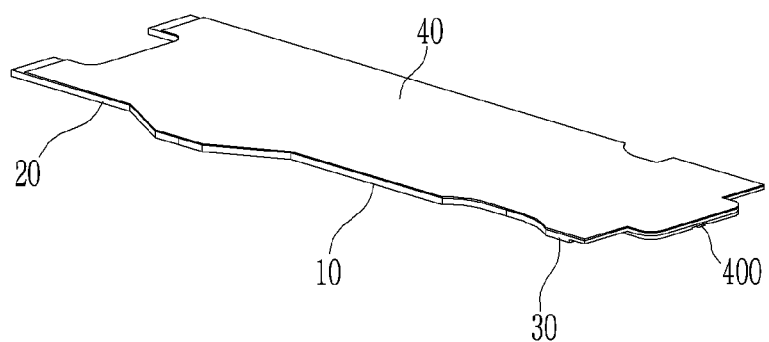
FIG. 5 is a view exemplarily illustrating a state in which the mat is attached to the seatback board of the full-flat rear seat according to the exemplary embodiment of the present disclosure, and the mat is unfolded.
Figure 6:
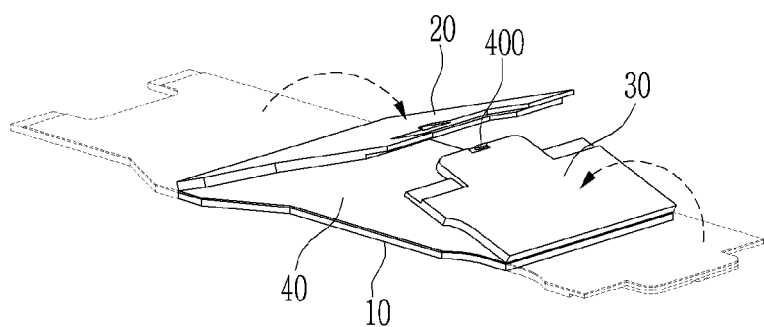
FIG. 6 is a view exemplarily illustrating a process of attaching the mat to the seatback board of the full-flat rear seat according to the exemplary embodiment of the present disclosure and folding the mat.
Figure 7:
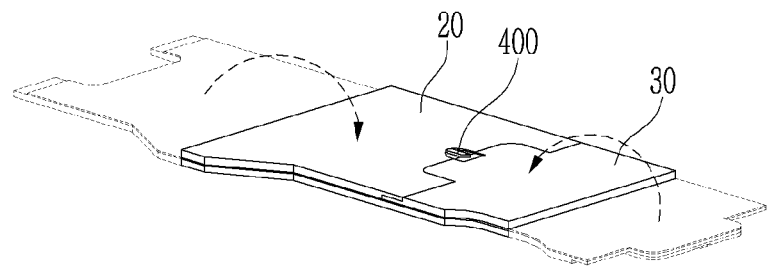
FIG. 7 is a view exemplarily illustrating a state in which the mat is attached to the seatback board of the full-flat rear seat according to the exemplary embodiment of the present disclosure, and the mat is folded.

FIG. 4 is an exploded perspective view exemplarily illustrating a seatback board and a mat of the full-flat rear seat according to the exemplary embodiment of the present disclosure, FIG. 5 is a view exemplarily illustrating a state in which the mat is attached to the seatback board of the full-flat rear seat according to the exemplary embodiment of the present disclosure, and the mat is unfolded, FIG. 6 is a view exemplarily illustrating a process of attaching the mat to the seatback board of the full-flat rear seat according to the exemplary embodiment of the present disclosure and folding the mat, and FIG. 7 is a view exemplarily illustrating a state in which the mat is attached to the seatback board of the full-flat rear seat according to the exemplary embodiment of the present disclosure, and the mat is folded.

As illustrated in FIG. 4, the seatback board 100 may include the center seatback board 10, the upper seatback board 20 provided to be connected to the upper side of the center seatback board 10, and the lower seatback board 30 provided to be connected to the lower side of the center seatback board 10. A mat 40 may be attached to one surface of the seatback board 100 and cover all the center seatback board 10, the upper seatback board 20, and the lower seatback board 30. The mat 40 may be configured as one piece.

As illustrated in FIG. 5, FIG. 6 and FIG. 7, when the upper seatback board 20 and the lower seatback board 30 hingedly rotate toward one surface of the center seatback board 10 in the state in which the mat 40 is attached to one surface of the seatback board 100, one surface of the upper seatback board 20 and one surface of the lower seatback board 30 come into contact with one surface of the center seatback board 10, and an end portion of the upper seatback board 20 and an end portion of the lower seatback board 30 are fixed by the locking device 400.

Figure 8:
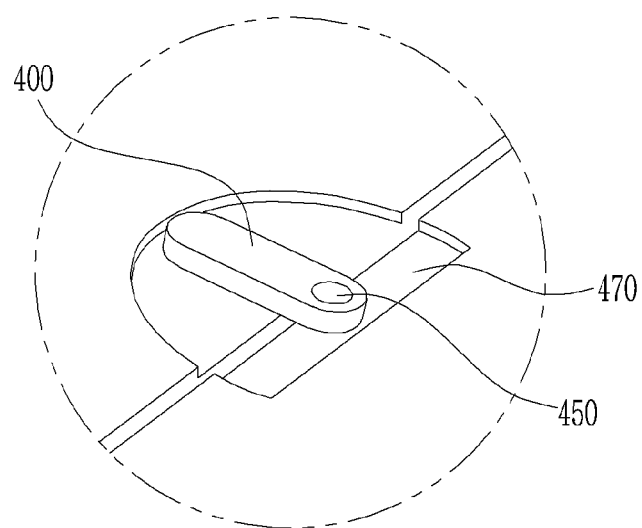
FIG. 8 is a view exemplarily illustrating a locking state of a locking device according to the exemplary embodiment of the present disclosure.
Figure 9:
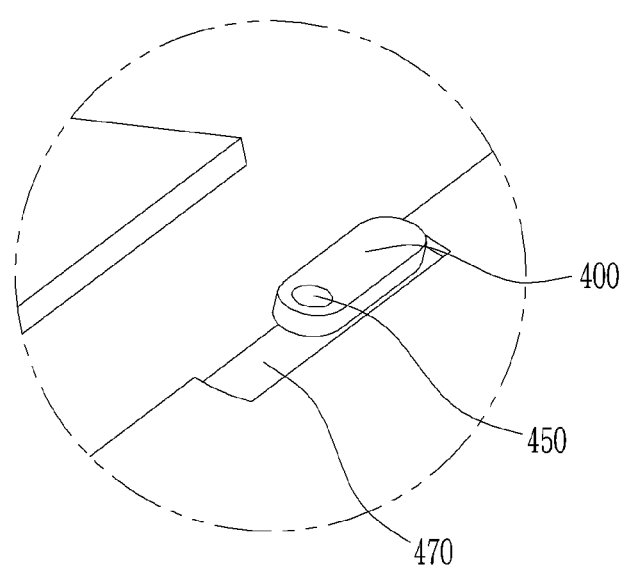
FIG. 9 is a view exemplarily illustrating an unlocking state of the locking device according to the exemplary embodiment of the present disclosure.

FIG. 8 is a view exemplarily illustrating a locking state of a locking device according to the exemplary embodiment of the present disclosure, and FIG. 9 is a view exemplarily illustrating an unlocking state of the locking device according to the exemplary embodiment of the present disclosure.

As illustrated in FIG. 8 and FIG. 9, the locking device 400 may be provided in a form of a bar including one end portion coupled to a protrusion 450 protruding from the other surface of the lower seatback board 30 and configured to be rotatable about the protrusion 450. Furthermore, the other end portion of the locking device 400 may rotate in a groove 470 formed over the other surface of the lower seatback board 30 and the other surface of the upper seatback board 10.

In the state in which one surface of the upper seatback board 20 and one surface of the lower seatback board 30 are in contact with one surface of the center seatback board 10, the locking device 400 rotates so that the other end portion of the locking device 400 is disposed on the other surface of the upper seatback board 20 so that the upper seatback board 20 and the lower seatback board 30 are fixed.

Figure 10:
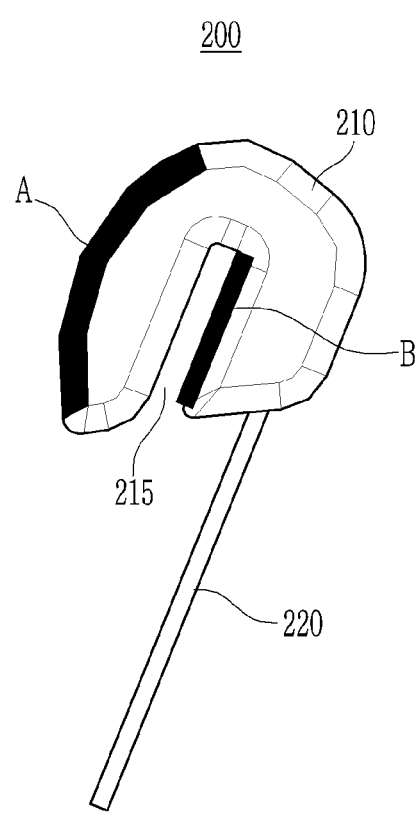
FIG. 10 is a side view exemplarily illustrating a headrest according to the exemplary embodiment of the present disclosure.
Figure 11A:
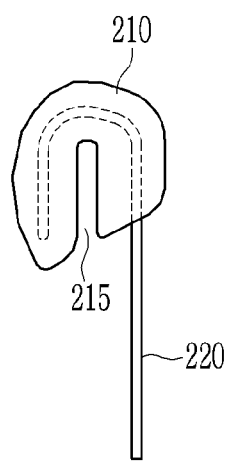
FIG. 11A, FIG. 11B and FIG. 11C are views exemplarily illustrating a coupled state and respective portions of the headrest according to the exemplary embodiment of the present disclosure.
Figure 11B:
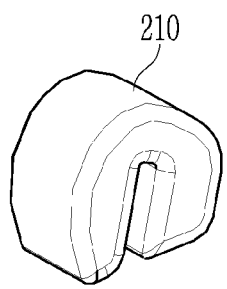
Figure 11C:
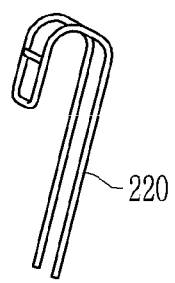

FIG. 10 is a side view exemplarily illustrating a headrest according to the exemplary embodiment of the present disclosure, and FIG. 11A, FIG. 11B and FIG. 11C are views exemplarily illustrating a coupled state and respective portions of the headrest according to the exemplary embodiment of the present disclosure.

As illustrated in FIG. 10, and FIG. 11B and FIG. 11C, the headrest 200 includes a pad 210 (FIG. 11B) configured to support a passenger's head, and a stay 220 (FIG. 11C) including one end portion inserted into the pad 210 and the other end portion protruding to the outside and inserted and fixed into an upper end portion of the rear seat 50.

The pad 210 may have a curved asymmetric shape. A portion of one end portion of the stay 220, which is inserted into the pad, may have a curved shape corresponding to the shape of the pad 210, and the other end portion of the stay 220 may be provided in a form of a bar divided into two extending bars.

One side of the pad 210 may be longer than the other side of the pad 210. As illustrated in FIG. 2, the occupant's head may be supported on one side of the pad 210 in the state in which the rear seat 50 is not folded. In the instant case, the occupant's head may be supported on a surface portion of the pad 210 indicated by 'A'.

The headrest 200 may be mounted on the upper end portion of the rear seat 50 as the other end portion of the stay 220 is inserted into the upper end portion of the rear seat 50. As necessary, the headrest 200 may be separated from the rear seat 50. As illustrated in FIG. 3, after the headrest 200 is separated, the headrest 200 is inserted into the upper end portion of the rear seat 50 in different forward and rearward directions in the state in which the rear seat 50 is folded so that the occupant's head may be supported on one side of the pad 210.

Meanwhile, a seatback insertion groove 215 may be formed in a center portion of the pad 210 so that the upper side of the upper seatback board 20 is inserted into the seatback insertion groove 215 when the seatback board 100 is unfolded in the state in which the rear seat 50 is folded. In the instant case, the upper seatback board 20 may be supported on a surface portion of the pad 210 indicated by 'B'.

Figure 12:
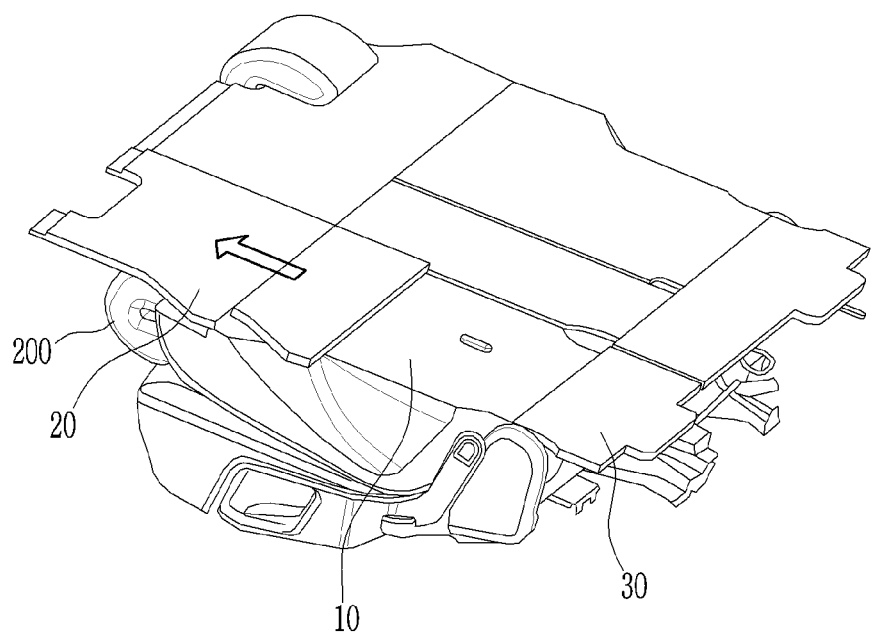
FIG. 12 is a view exemplarily illustrating a full-flat rear seat according to various exemplary embodiments of the present disclosure.

FIG. 12 is a view exemplarily illustrating a full-flat rear seat according to various exemplary embodiments of the present disclosure.

Referring to FIG. 12, the upper seatback board 20 may be provided at the upper side of the center seatback board 10 to slide relative to the center seatback board 10. In the state in which the rear seat 50 is not folded, the upper seatback board 20 may be disposed to overlap the center seatback board 10. In the state in which the rear seat 50 is folded, the upper seatback board 20 may slide toward the upper side of the rear seat 50 relative to the center seatback board 10. After the upper seatback board 20 slides, the upper seatback board 20 may be placed on approximately the same plane as the center seatback board 10. In the instant case, the lower seatback board 30 hingedly rotates at the lower end portion of the center seatback board 10 and is placed on approximately a same plane as the center seatback board 10. Therefore, the expanded loading space may be entirely flat.

Figure 13:
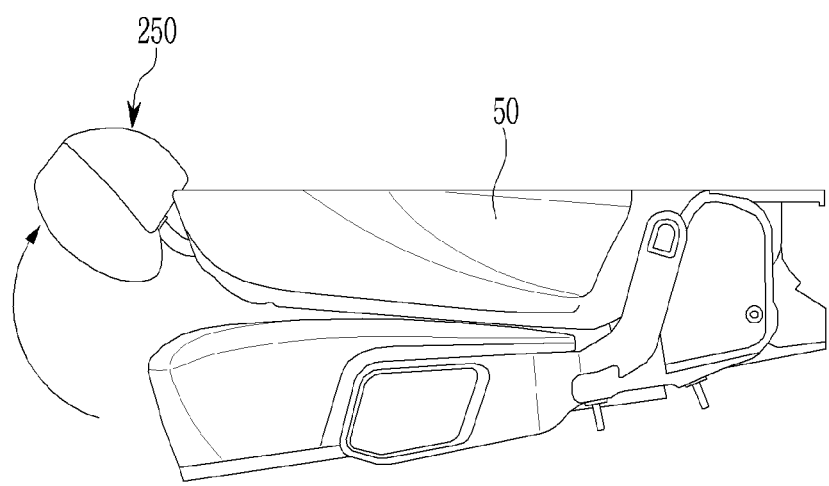
FIG. 13 is a side view exemplarily illustrating a headrest according to various exemplary embodiments of the present disclosure.

FIG. 13 is a side view exemplarily illustrating a headrest according to various exemplary embodiments of the present disclosure.

As illustrated in FIG. 13, a headrest 250 may be provided to be folded at an angle at the upper end portion of the rear seat 50. That is, in the state in which the rear seat 50 is folded, an angle of the headrest 250 is adjusted by bending the headrest 250 upward without separating the headrest 250 so that the occupant's head may be supported on the pad.

As described above, according to the exemplary embodiment of the present disclosure, the seatback board may be provided and attached to the rear surface of the backrest of the rear seat of the vehicle, and the rear seat may be folded forward thereof. Therefore, it is possible to improve integrity of the seatback board and the rear seat in a non-used condition and expand the rear loading space.

Furthermore, the seatback board includes three pieces, and the lower seatback board is unfolded between the rear seat and the luggage board so that the gap between the rear seat and the luggage board may be filled, and the expanded loading space may be entirely flat.

Furthermore, because the headrest may be detachably attached to the upper end portion of the rear seat in the different forward and rearward directions, the headrest may be used as a pillow, and the luggage loading space may be further expanded to that extent.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A full-flat rear seat, which is a collapsible full-flat rear seat, the full-flat rear seat comprising:
    a seatback board mounted on a rear surface of a backrest of the rear seat of a vehicle and providing a flat support surface together with a luggage board of the vehicle in being selectively unfolded, when the rear seat rotates,
    wherein the seatback board includes:
        a center seatback board mounted on a rear surface of the rear seat of the vehicle;
        an upper seatback board provided at an upper side of the center seatback board and configured to move relative to the center seatback board; and
        a lower seatback board provided at a lower side of the center seatback board and hinged thereto and configured to hingedly rotate toward one surface of the center seatback board,
    wherein the upper seatback board is hinged to the center seatback board and is provided to hingedly rotate toward the one surface of the center seatback board,
    wherein the upper seatback board and the lower seatback board are fixed to each other by a locking device in a state in which the upper seatback board hingedly rotates and comes into contact with the one surface of the center seatback board,
    wherein the locking device is provided in a form of a bar coupled to a protrusion protruding from a surface of the lower seatback board and configured to be rotatable about the protrusion, and
    wherein the locking device rotates over the surface of the lower seatback board and a surface of the upper seatback board.

2. The full-flat rear seat of claim 1,
    wherein the locking device rotates in a groove formed over the surface of the lower seatback board and the surface of the upper seatback board.

3. The full-flat rear seat of claim 1,
    wherein a mat rests on one surface of the seatback board and covers the seatback board.

4. A full-flat rear seat, which is a collapsible full-flat rear seat, the full-flat rear seat comprising:
    a seatback board mounted on a rear surface of a backrest of the rear seat of a vehicle and providing a flat support surface together with a luggage board of the vehicle in being selectively unfolded, when the rear seat rotates,
    wherein the seatback board includes:
        a center seatback board mounted on a rear surface of the rear seat of the vehicle;
        an upper seatback board provided at an upper side of the center seatback board and configured to move relative to the center seatback board; and a lower seatback board provided at a lower side of the center seatback board and hinged thereto and configured to hingedly rotate toward one surface of the center seatback board, wherein a headrest configured to support a passenger's head is inserted and provided into an upper end portion of the rear seat, wherein the headrest is selectively insertable into the upper end portion of the rear seat in different forward and rearward directions as the rear seat rotates, wherein the headrest includes:

a pad configured to support the passenger's head; and a stay including a first end portion inserted into the pad and a second end portion protruding to the outside and inserted and fixed into the upper end portion of the rear seat, and wherein a seatback insertion groove is formed in the pad so that an upper side of the upper seatback board is insertable into the seatback insertion groove when the seatback board is unfolded as the rear seat rotates.

5. The full-flat rear seat of claim 1, wherein the lower seatback board rests on the luggage board to define the flat support surface in a state in which the seatback board is unfolded.

6. A full-flat rear seat, which is a collapsible full-flat rear seat, the full-flat rear seat comprising:

a seatback board mounted on a rear surface of a backrest of the rear seat of a vehicle and providing a flat support surface together with a luggage board of the vehicle in being selectively unfolded, when the rear seat rotates, wherein the seatback board includes:

a center seatback board mounted on a rear surface of the rear seat of the vehicle;

an upper seatback board provided at an upper side of the center seatback board and configured to move relative to the center seatback board; and a lower seatback board provided at a lower side of the center seatback board and hinged thereto and configured to hingedly rotate toward one surface of the center seatback board, and wherein the upper seatback board is provided at the upper side of the center seatback board and configured to slide relative to the center seatback board.

7. The full-flat rear seat of claim 1, wherein a headrest configured to support a passenger's head is inserted and provided into an upper end portion of the rear seat, and wherein the headrest is bent at the upper end portion of the rear seat while defining an angle.

8. The full-flat rear seat of claim 4, wherein a mat rests on one surface of the seatback board and covers the seatback board.

9. The full-flat rear seat of claim 4, wherein the lower seatback board rests on the luggage board to define the flat support surface in a state in which the seatback board is unfolded.

10. The full-flat rear seat of claim 4, wherein a headrest configured to support a passenger's head is inserted and provided into an upper end portion of the rear seat, and wherein the headrest is bent at the upper end portion of the rear seat while defining an angle.

11. The full-flat rear seat of claim 6, wherein a mat rests on one surface of the seatback board and covers the seatback board.

12. The full-flat rear seat of claim 6, wherein the lower seatback board rests on the luggage board to define the flat support surface in a state in which the seatback board is unfolded.

13. The full-flat rear seat of claim 6, wherein a headrest configured to support a passenger's head is inserted and provided into an upper end portion of the rear seat, and wherein the headrest is bent at the upper end portion of the rear seat while defining an angle.

* * * * *